United States Patent [19]

Takase et al.

[11] 4,014,624
[45] Mar. 29, 1977

[54] METHOD AND DEVICE FOR STARTING PUMP

[75] Inventors: Mituo Takase, Mito; Hisao Inoue, Hitachi; Takeo Hachiya, Hitachi; Katsumi Seno, Hitachi, all of Japan

[73] Assignee: Hitachi, Ltd., Japan

[22] Filed: Aug. 15, 1975

[21] Appl. No.: 604,946

[30] Foreign Application Priority Data

Aug. 16, 1974 Japan .............................. 49-93341

[52] U.S. Cl. .................................. 415/1; 415/500; 290/1 R
[51] Int. Cl.² ........................................ F01D 17/00
[58] Field of Search ............. 415/1, 500; 290/1, 52

[56] References Cited

UNITED STATES PATENTS

| | | | |
|---|---|---|---|
| 3,238,534 | 3/1966 | Hartland | 415/500 |
| 3,309,057 | 3/1957 | Tonooka | 415/1 |
| 3,658,436 | 4/1972 | Oishi | 415/1 |
| 3,890,059 | 6/1975 | Takase | 415/1 |

Primary Examiner—C. J. Husar
Attorney, Agent, or Firm—Craig & Antonelli

[57] ABSTRACT

There is disclosed a method for starting a pump, wherein when a pump runner effects the idle running in a runner chamber which is filled with compressed air, a water-pumping-up starting instruction is given, then a drain valve is first closed according to the water-pumping-up starting instruction, the aforesaid drain valve being provided in a draft tube for discharging pressurized water from a runner band chamber of the runner chamber; then compressed air in the runner chamber is discharged therefrom; subsequently water is charged into the runner chamber; and after water pressure at the adjacent portion of the runner periphery in the runner chamber has been raised to a given level, a by-pass valve and a main valve in a discharge tube and guide vanes are sequentially opened; and a device for automatically substantiating the method.

13 Claims, 9 Drawing Figures

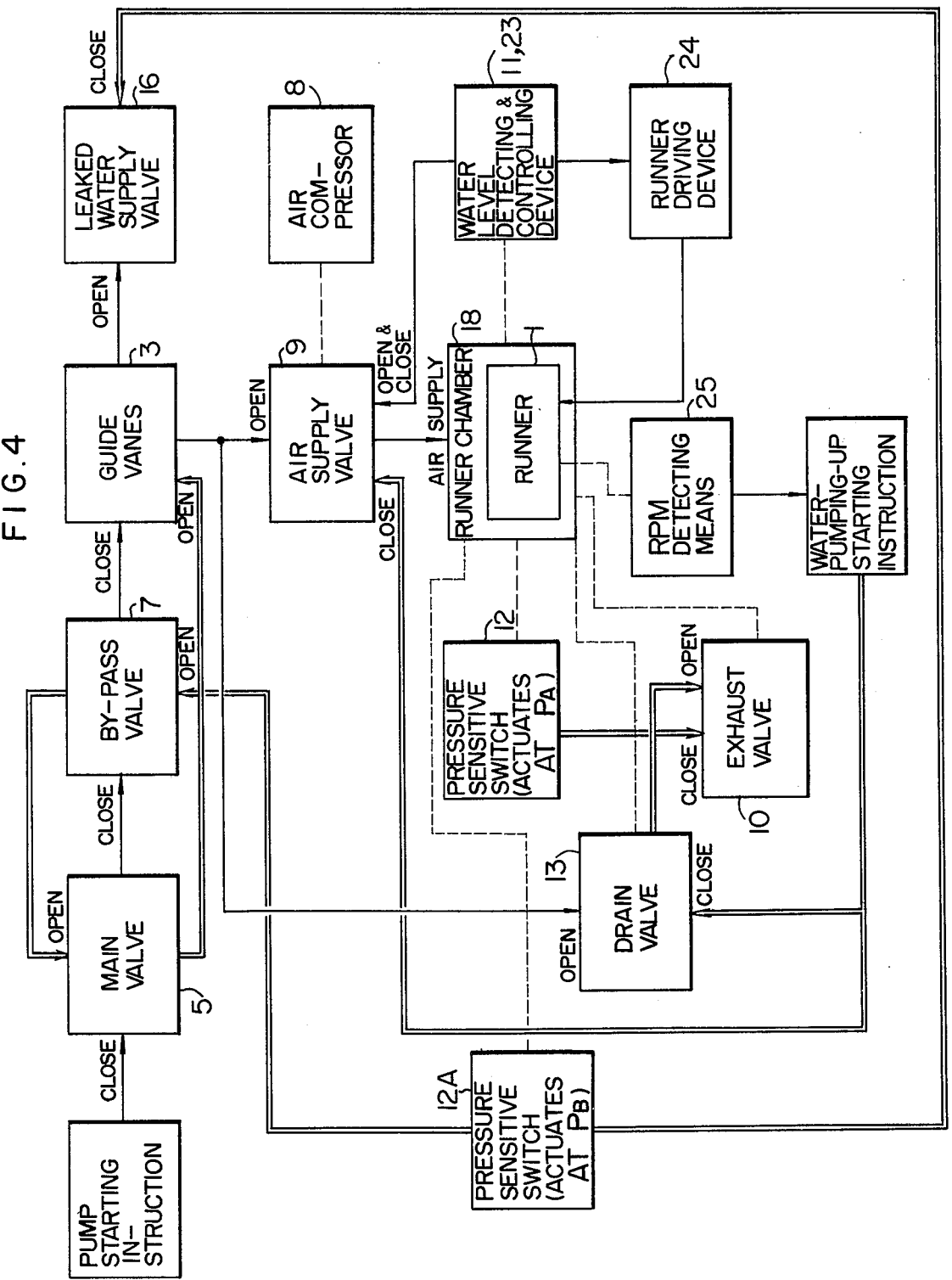

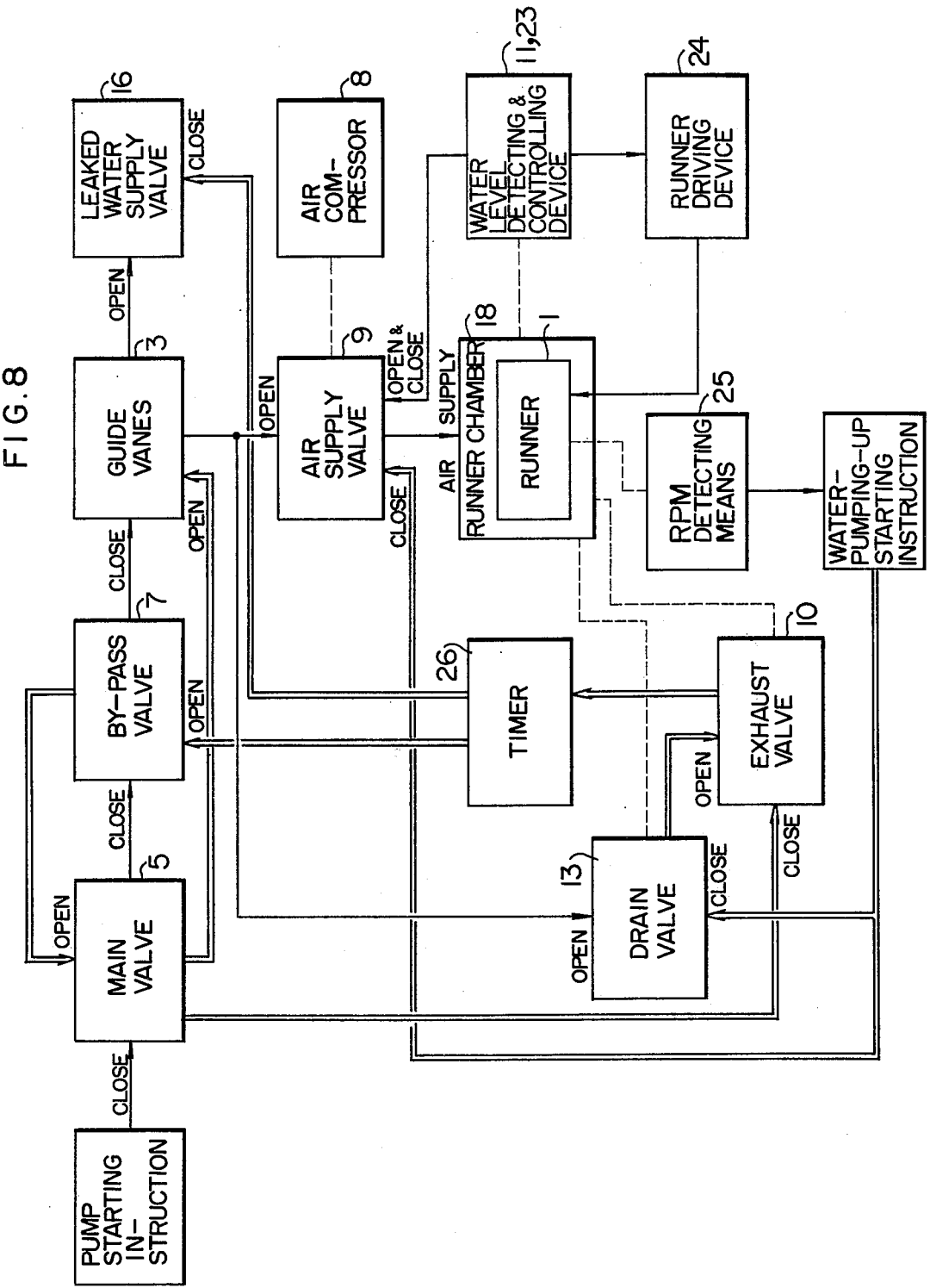

METHOD AND DEVICE FOR STARTING PUMP

BACKGROUND OF THE INVENTION

This invention relates to a method for starting a pump and a device therefor, and more particularly to the improvements in a method for starting a high waterhead centrifugal pump, for example a pump-hydraulic turbine and a device therefor.

For example, a pump-hydraulic turbine, in general, includes essentially; a runner directly connected to a rotary main shaft coupled to a generator motor and a starting electric motor and adapted to rotate integrally with the shaft; a plurality of guide vanes surrounding the runner; a draft tube provided below the runner; a casing entirely encompassing the plurality of guide vanes; a pressurized-water iron tube coupled to the casing; a main valve provided midway in the pressurized water iron tube; a by-pass valve for communicating the upstream and downstream sides of the pressurized-water iron tube with each other; an air compressor for feeding compressed air by way of a passage to the runner chamber which houses the runner therein; an air supply valve provided midway in said passage; a water-level controlling device opening and closing the air supply valve for adjusting a level of water in the runner chamber; a pressure sensitive switch adapted to be actuated upon sensing the pressure which prevails around the runner, to thereby actuate associated means; a drain valve for discharging from the runner chamber leaking water introduced from the plurality of guide vanes into the runner chamber during the idle running of the runner; a cooling water valve for feeding cooling water during the idling of the runner; a passage with a purge valve, through which is discharged air dwelling in the portion of the pressurized-water iron tube between the main valve and the runner; and a leaking-water supply passage with a leaking water supply valve, through which is supplied to the casing water which leaks into the runner chamber through gaps between guide vanes when completely closed.

In the pump-hydraulic turbine thus constructed, the below-described procedures have hitherto been taken for starting pumping operation thereof. To begin with, the main valve, by-pass valve and a plurality of guide vanes are maintained in a completely closed position, with the runner maintained stationary. Then, the air supply valve connected to the air compressor is brought into an open position, and at the same time, the drain valve connected to the runner chamber as well as the leaking-water supply valve connected to the pressurized-water iron tube leading to the casing are both brought into an open position. Since the air supply valve and the drain valve are brought into a full open position, compressed air is fed to the runner chamber, while water is discharged therefrom, so that, the level of water in the runner chamber is lowered. When the level of water in the runner chamber is lowered to a given level and the runner becomes exposed to compressed air, then the water level controlling device is actuated to close the air supply valve, whereby the feeding of compressed air to the runner chamber is interrupted. Thereafter, the water level controlling device is actuated to properly open and close the air supply valve for maintaining the level of water in the runner chamber constant. When the level of water in the runner chamber reaches a given level as a result of the substitution for compressed air, then the starting electric motor is energized, thereby starting rotation of the runner in the direction to effect the pump action. At this time, the runner is maintained exposed to compressed air, such that only the extremely small resistance is imposed on the runner when rotating. Furthermore, there is a possibility that pressurized water in the casing leaks through the gaps between guide vanes, which are completely closed, into the runner chamber, and in turn, compressed air in the runner chamber is admitted in the casing. The casing, however, may usually be maintained filled with water, because the leaking water supply valve is maintained open so as to feed to the casing water of an amount proportional to that of water leaking through gaps between guide vanes closed.

When the runner rotated by the runner starting electric motor reaches a specified r.p.m., the preparations for starting the water-pumping-up running is completed. Thus, the water-pumping-up starting instruction is given by runner-speed detecting means, whereupon the runner starting motor is deenergized, and in turn the generator motor is energized. At the same time, the water level controlling device is rendered inoperative, and the by-pass valve and the main valve are sequentially turned to an open position. As soon as the by-pass valve begins to open, the leaking water supply valve is closed. Susequently, the drain valve is closed, while the exhaust valve is opened. Due to the exhaust valve being opened, water is fed from the draft tube to the runner chamber, whereby the runner chamber is filled with water, thereby raising the level of pressure of water in the vicinity of the runner periphery. When water pressure in the vicinity of the runner periphery is raised to a level allowing water-pumping-up action, then the pressure sensitive switch detects the pressure, thereby bringing the guide vanes into open position, whereby the water-pumping-up running is started.

The conventional method for starting pumping operation is satisfactory in a pump device whose water head is as low as 100m or thereabout, while with an increase in water head in the pump, a difficulty has been experienced with the conventional techniques for starting pumping operation.

Particularly, when a pump, whose water head is as high as 700 to 1000m, is widely used, as in the present time, water pressure in the pump is increased to two times or three times as high as that experienced in the past. In case of such a high water head pump, there is experienced in the intermediate stage providing for starting pumping operation i.e., in the condition where by-pass valve and main valve are opened, the guide vanes are closed and the drain valve is opened, pressure in the casing is considerably raised, with the resultant increase in the quantity of water leaking from the guide vanes closed. As a consequence, a great amount of water fills a part of the runner chamber, thus imposing extremely high resistance on the runner rotating.

As the countermeasure for solving the problem, it might be effective to increase the size of draining means leading to the runner chamber in proportion to the amoung of water leaking from the guide vanes. However, to increase a diameter of a drain port leads to cavitation or vibrations during the normal water-pumping-up running of the pump, resulting in the lowered efficiency of the pump. Practically, increasing the number of drain tubes or the diameter of the drain tube, in most cases, is difficult or almost impossible from the standpoint of space.

Whether the amount of water leaking from the guide vanes is large or small is dependent on the precision of the guide vanes manufactured. In the initial stage of running of the pump, the amount of water leaking is only a little, but increases to a substantial degree during a long service of the pump due to severe mechanical looseness resulting from wear. To sustain the initial amount of water leaking, check and repair are required from time to time, resulting in a shortened running period of time. Thus, from the practical viewpoint, it is concluded impossible to prevent increase of the amount of leaking water.

If the amount of water leaking from the guide vanes increases, and a substantial amount of water stands in the runner chamber, then it follows that the water remains as pressurized water in the vicinity of the runner periphery, and part of the water makes ingress in the runner crown chamber and the runner band chamber which are defined above and below the runner. Pressurized water admitted in the runner band chamber is discharged therefrom, because the drain valve is maintained open at this stage, and consequently, pressure in the runner crown chamber becomes higher than that in the runner band chamber, whereas an extremely large thrust is exerted on the runner in the direction to urge the runner downwards. This inevitably and inadvantageously entails the use of a large, strong thrust bearing. Furthermore, water prevailing in the vicinity of the runner periphery is pressurized, and eventually water pressure, although the exhaust valve has been maintained open, is raised to a level allowing the water-pumping-up action before air is completely exhausted. Consequently, despite the air residing in the runner chamber, the pressure sensitive switch is actuated, to thereby bring the guide vanes to an open position, and thus, the water-pumping-up running is prematurely started. In the event that a great amount of air is contained in the water being pumped up, then, vibrations and noise of the pump result, as is well known, and there may arise a case where streams of water pumped up are blocked by air, with the failure to run the pump.

In short, if the conventional method for starting a pump is adopted for a high water head pump, such drawbacks are experienced that the severe running condition is imposed on the thrust bearing, as well as vibrations and noise of the pump arise.

These drawbacks are attributable to an increase in an amount of water leaking from the guide vanes into the runner chamber. For a smooth starting of the high water head pump, it is effective to reduce an amount of leaking water, or if reduction of the amount of leaking water is not allowed, to control pressure both in the runner crown chamber and in the runner band chamber, so as to prevent an extreme unbalance in pressures between both chambers, and to completely remove air from the runner chamber before pressurized water in the vicinity of the runner periphery is raised to a level as high as the water-pumping-up pressure.

SUMMARY OF THE INVENTION

It is a primary object of the present invention to provide a method for starting a pump and a device therefor, wherein the starting of a high water head pump is ensured.

It is another object of the present invention to provide a method for starting a pump and a device therefor, wherein there is no possibility of a runner receiving a high thrust at the time of the starting of the pump.

It is a further object of the present invention to provide a method for starting a pump and a device therefor, which is capable of minimizing the amount of water leaking, so that resistance imposed on the rotating runner may be reduced to the minimum, said amount of water leaking from the closed guide vanes into the runner chamber for a duration in which the guide vanes are closed, compressed air is charged in the runner chamber, and the runner continues idle-running in compressed air.

It is a still further object of the present invention to provide a method for starting a pump and a device therefor, which ensures the rapid starting of the pump.

According to the present invention, there are provided a method for starting a pump and a device therefor, said method being characterized by the steps of; charging compressed air to a runner chamber; starting rotation of the runner; closing a drain valve after the runner has reached a specified r.p.m.; opening an exhaust valve for use in discharging compressed air in the runner chamber, thereby removing air from the runner chamber; and opening a by-pass valve, main valve and the guide vanes when pressure of water prevailing in the vicinity of the runner periphery in the runner chamber reaches a given level.

BRIEF DESCRIPTION OF THE DRAWINGS

FIGS. 4 and 5 are a block diagram and flow chart, respectively, showing another embodiment, which are similar to FIGS. 2 and 3;

DETAILED DESCRIPTION OF PREFERRED EMBODIMENTS

Figure 1:
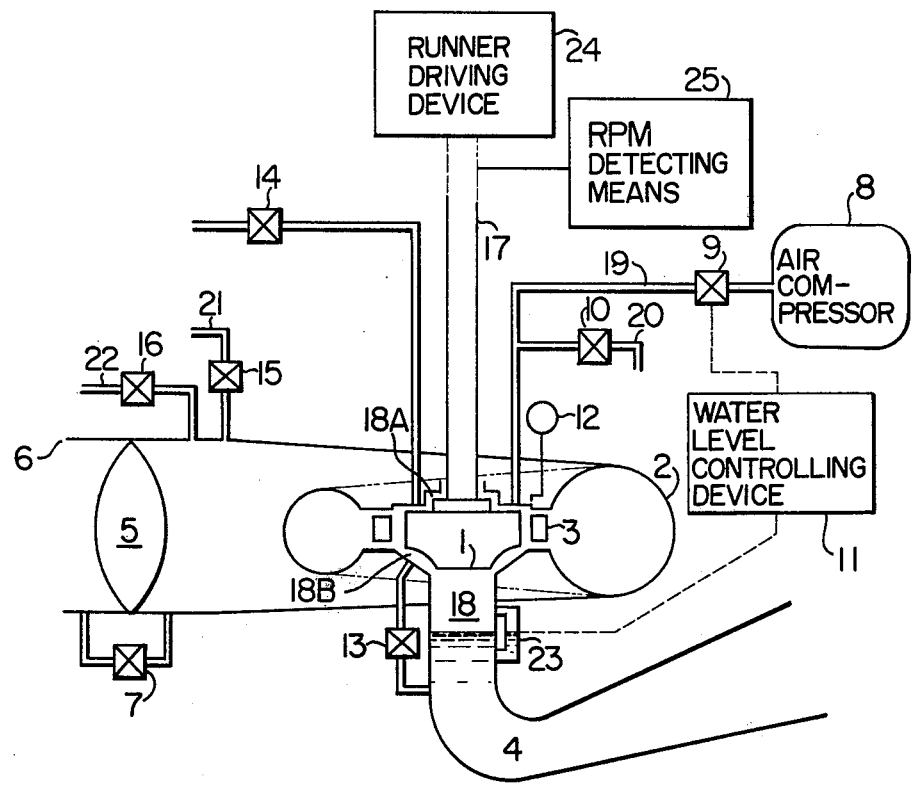
FIG. 1 is a longitudinal cross sectional, side elevational view showing the outline of a pump-hydraulic turbine.

FIG. 1 is a longitudinal cross sectional, side elevational view showing the outline of a pump-hydraulic turbine, and description will be given below to the case where a pumping operation of the pump-hydraulic turbine is started.

In FIG. 1, a runner 1 is secured to the lower end of a main shaft 17. Coupled to the top end of the main shaft 17 is a runner driving device 24, which drives the main shaft 17. The runner driving device 24 is normally composed of a generator motor and a starting motor. Connected to the main shaft 17 is r.p.m. detecting means 25, which is adapted to produce signals when the main shaft 17 reaches a specified r.p.m. A casing 2 is provided, entirely surrounding the outer periphery of the runner 1, and connected to a pressurized water iron tube 6 which serves as a discharge tube in pumping operation of the pump-hydraulic turbine. The pressurized water iron tube 6 has a main valve 5 midway thereof, and a by-pass valve 7 is provided in a passage bypassing the main valve 5. A plurality of guide vanes are provided between the casing 2 and the runner 1, covering the entire periphery of the runner. The plurality of guide vanes are openable and adjust an amount of water being pumped up by the runner 1 or an amount of water which is introduced from the pressurized water iron tube 6 by way of the casing 2 into the runner 1. A draft tube 4 is disposed below the runner 1. End covers disposed on the opposite sides of the runner 1 define a runner chamber 18. The runner chamber 18 includes a runner crown chamber 18A located above the runner 1 and a runner band chamber 18B located below the runner. Connected to the draft tube 4 is a water level detecting means 23 for detecting a level of water in the runner chamber 18. For supplying compressed air to the runner chamber 18, an air compressor 8 is communicated by way of a passage 19 with the runner chamber 18, and an air supply valve 9 is provided midway of the passage 19. The air supply valve 9 is adapted to be opened and closed according to the instruction from a water level controlling device 11 which is actuated according to the signals from the water level detecting means 23, and also adapted to be opened when the plurality of guide vanes are brought into a full open position according to the pump-starting instruction which will be detailed later. A passage 20 is stemed from a portion of the passage 19 between the runner chamber 18 and the air supply valve 9, and has an exhaust valve 10 midway thereof. Connected to the runner band chamber 18B of the runner chamber 18 is a passage leading to the draft tube 4, which passage serves to discharge from the runner chamber water leaking from the guide vanes closed, when the runner chamber is filled with compressed air. The passage has a drain valve 13 midway thereof. Connected to the runner chamber 18 is a pressure sensitive switch 12 which is adapted to be opened and closed upon sensing the pressure in the vicinity of the runner periphery, i.e. pressure prevailing in a portion between the outer periphery of the runner and the plurality of guide vanes. The action of the pressure sensitive switch will be referred to later. Adjoined to the runner chamber 18 is a passage for supplying cooling water thereto, which passage has a cooling water valve 14. A purge valve 15 is provided midway of a passage 21 open to the upper side of the casing 2. The passage 21 serves to remove from the casing 2 compressed air admitted from the runner chamber 18 in the casing. A passage 22 is open to the casing 2 at a desired point between the main valve 5 and the runner 1, and a leaked water supply valve 16 is provided midway of the passage 22. The passage 22 serves to supply to the casing water of an amount equal to that of water leaking from the guide vanes 3 during the idling of the runner 1. The main valve 5, by-pass valve 7, air supply valve 9, exhaust valve 10, drain valve 13, leaked water supply valve 16 and guide vanes all are of the type which is actuated by normal hydraulic mechanisms, to each of which is connected a device for controlling supply of pressurized oil (not shown). The device for controlling supply of pressurized oil is controlled by an electrically controlled device (not shown) connected to the water level controlling device, pressure sensitive switch, r.p.m. detecting means, runner driving device, and etc. The device for controlling supply of pressurized oil and the electrically controlled device may be of any type, so far as same is suited for substantiating the methods for starting a pump below described, and hence no description is given thereto.

Figure 2:
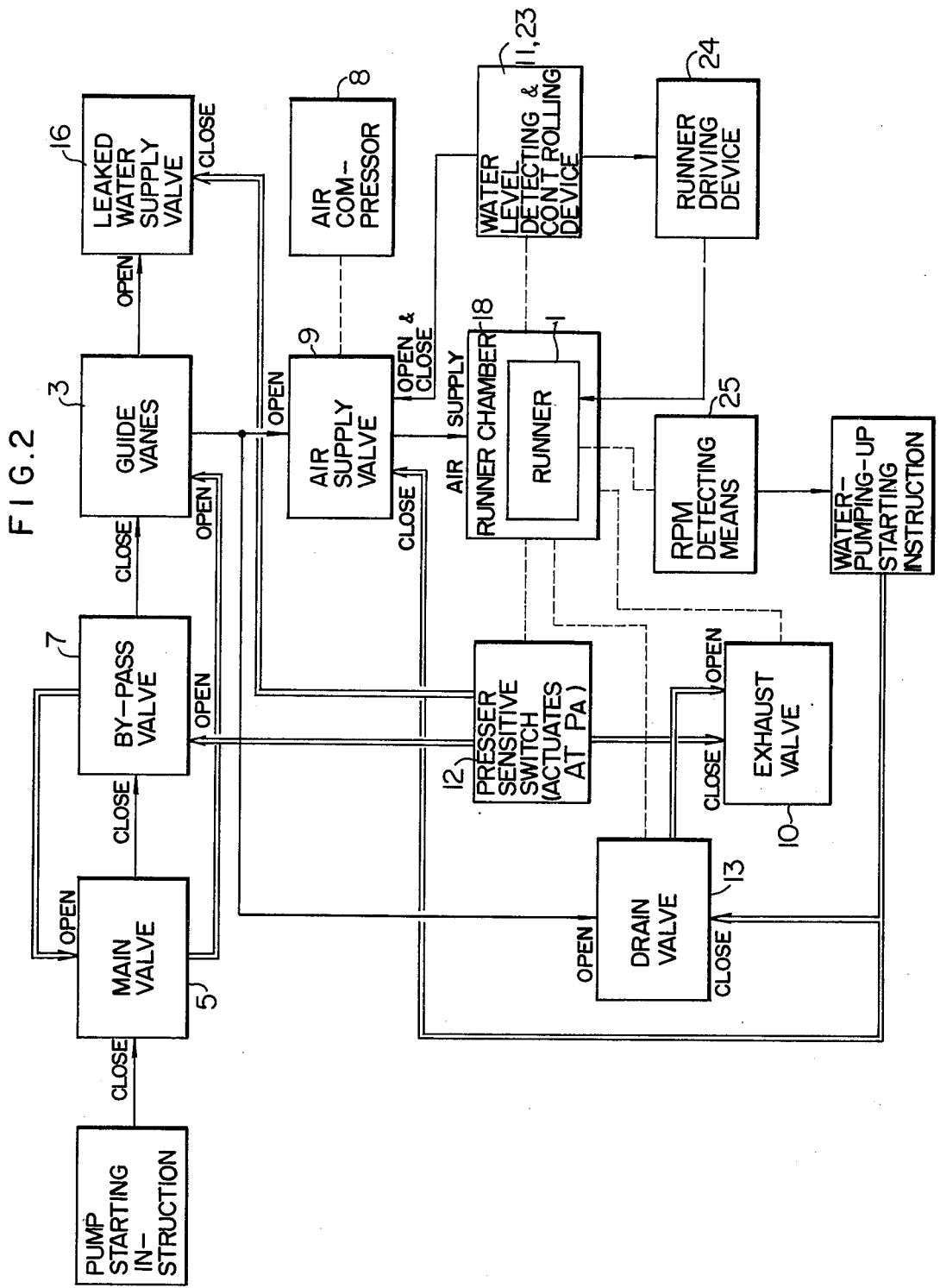
FIG. 2 is a block diagram showing the operational sequence for starting a pumping operation of the pump-hydraulic turbine, according to a preferred embodiment of the present invention.

The operation for switching the pump-hydraulic turbine from the hydraulic turbine running to the pump running will be referred to, in conjunction with the block diagram of FIG. 2. When the pump-starting instruction is given by an operator, then the main valve 5, by-pass valve 7 and guide vanes 3 are turned to a full close position in the sequence described according to the pump-starting instruction. As a result that respective valves have been closed, the runner is stopped. After the plurality of guide vanes have been brought into a full close position, the leaking water supply valve 16, drain valve 13 and air supply valve 9 are turned open. (When the pump-starting instruction is given in the status in which the pump-hydraulic turbine is maintained stationary, and the plurality of guide vanes 3 have been completely closed, then respective devices and means are actuated on and after the closure of the guide vanes.) As a result that the air supply valve 9 has been opened, compressed air is introduced from the air compressor 8 into the runner chamber 18, and thus the charging of compressed air to the runner chamber 18 starts. In the stage in which the level of water in the runner chamber 18 begins to be lowered due to compressed air fed thereto, no air is admitted to the casing 2, because the pressure in the casing 2 is maintained at a level which is not lower than that of the pressure in the runner chamber 18 by the leaking water supply valve 16 compensating for the water leaking past wicket gates. On the other hand a small amount of water is leaked from the plurality of guide vanes closed into the runner chamber, but the leaked water is discharged therefrom through the draft tube 4, because of the drain valve 13 being maintained open, and hence there is no fear that such leaking water imposes resistance on the runner when rotating.

When the level of water in the runner chamber 18 is lowered to a predetermined level where, the runner 1 is entirely exposed to compressed air, then water-level detecting means 23 detects the level of water in the runner chamber 18 and actuates the water-level controlling device 11, thereby closing the air supply valve 9. In the stages succeeding thereto, the air supply valve 9 is properly opened and closed by water-level detecting means and the water-level controlling device 11, so that water in the runner chamber 18 may be maintained at a given level. This is the countermeasure against the fact that the level of water in the runner chamber 18 tends to be gradually raised because compressed air in the runner chamber 18 is discharged from a sealing portion (not shown) of the main shaft 17.

When the water-level detecting means 23 detects the given level of water, the water-level controlling device 11 is actuated, and at the same time the starting electric motor of the runner driving device 24 is energized whereby the runner 1 starts rotating in the direction of pump action.

When the r.p.m. of the runner is increased to a specified rated r.p.m., then the r.p.m. detecting means 25 is actuated to give the water-pumping-up starting instruction. The preparations for starting the water-pumping-up running are completed when the r.p.m. detecting means 25 has detected a specified rated r.p.m. of the runner 1. In this stage, the starting motor is deenergized, while the generator-motor is, in turn, energized to act as a motor, and thus the runner 1 continues idle run at the rated r.p.m.

Figure 3:
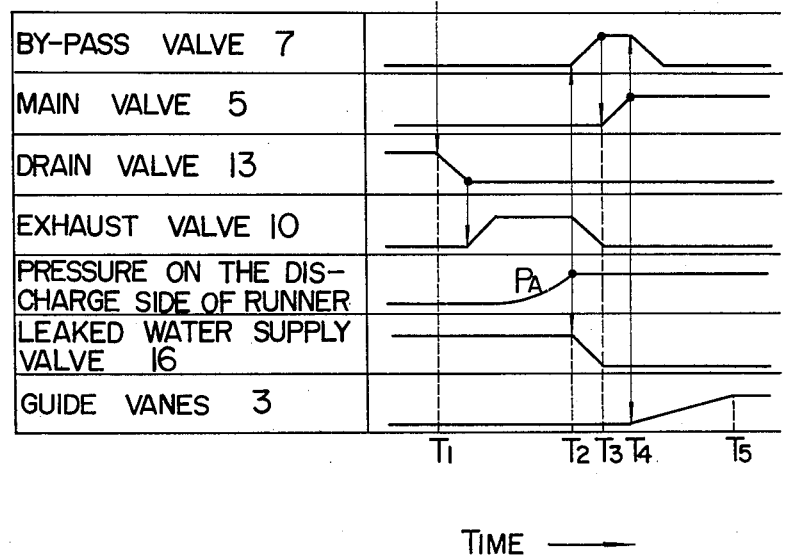
FIG. 3 is a flow chart showing the operational conditions of the associated devices and means after a water-pumping-up starting instruction has been given in the above embodiment.

The above described operational route is represented by a single solid line in FIG. 2, while the succeeding operational route is represented by two solid lines. In FIG. 3, there is shown an operational sequence of respective devices and means after the water-pumping-up starting instruction has been given. The arrows given in FIG. 3 signify the instructions. The water-pumping-up starting instruction is given to the drain valve 13 which is maintained open, whereby the drain valve 13 begins to close. At the same time, the water-pumping-up starting instruction is given to the air supply valve 9 as well, whereby the air supply valve 9 whose opening and closing have been governed by the water level controlling device 11 is released from the control of the water level controlling device, thereby being maintained in a close position.

When the drain valve 13 is completely closed, water leaked from the guide vanes 3 is gathered in the runner chamber 18, and pressurized due to the rotating runner 1 to dwell in the vicinity of the outer periphery of the runner 1 as pressurized water. The pressurized water tends to ingress in the runner crown chamber and runner band chamber above and below the runner 1, but there is little possibility that the balance of pressure between both chambers is lost, because the drain valve 13 is maintained close, and hence there is no risk that thrust in the axial direction is biased to one direction. In this stage, the main valve 5 and by-pass valve 7 are maintained close, such that pressure in the casing 2 is not so high and a quantity of water leaked from the guide vanes is not so much. Taking these points in view, there is no factor which has a bad influence on thrust.

As soon as the drain valve 13 is brought into a full close position, the signals which have detected the full closure of the valve 13 are fed to the exhaust valve 10, and thus the exhaust valve 10 begins to open. As a result that the exhaust valve 10 has been brought into a full open position, compressed air in the runner chamber 18 is discharged by way of the passages 19 and 20 to atmosphere. In place of compressed air, water in the draft tube 4 is admitted in the runner chamber 18, and the water is pressurized due to the runner 1 rotating at the specified rated r.p.m. to dwell in the vicinity of the periphery of the runner 1 as pressurized water. At this time, pressurized water is discharged through the passage 20 together with compressed air. When pressure in the vicinity of the runner periphery is raised to a level as high as the water-pumping-up pressure (shown at PA in FIG. 3), then the pressure sensitive switch 12, upon sensing that pressure, is actuated, whereby the exhaust valve 10 and leaked water supply valve 16 are brought into a close position, and at the same time the by-pass valve 7 begins to open.

After the by-pass valve 7 has been brought into a full open position, and pressure in the casing 2 has been raised to a satisfactorily high level, the main valve 5 begins to open according to the by-pass-valve-full-open-position detecting signals. When the main valve 5 has been brought into a full open position, the main-valve-full-open-position detecting signals are fed to the guide vanes 3, and thus the guide vanes 3 begin to open, whereby the water-pumping-up running starts.

As is apparent from the foregoing, in case of water being pumped up, the drain valve 13 has been closed before the main valve and by-pass valve 7, are opened. So far as the situation is maintained, there is no possibility that pressure in the casing 2 is unwantedly raised, and hence only a small amount of water leaks from the guide vanes closed. A small amount of water leaking from the guide vanes is collected as pressurized water in the vicinity of the runner periphery, and the pressurized water is admitted in the runner crown chamber and runner band chamber. This, however, scarecely disturbs the balance of the thrust acting on the runner 1, because the drain valve 13 is maintained close.

In the embodiment described, the main valve 5, by-pass valve 7 and the plurality of guide vanes 3 are so arranged as to be brought into an open position after pressure in the vicinity of the runner periphery has been raised to a level as high as the water-pumping-up pressure. Therefore, the water-pumping-up running starts at a time interval after the pressure in the vicinity of the runner periphery has reached the water-pumping-up pressure, which interval corresponds to a time during which the by-pass valve 7, main valve 5 and the plurality of guide vanes 3 are brought into an open position.

As is obvious from FIG. 3, it is after the lapse of a given time necessary for bringing the by-pass valve 7 and main valve 5 into a full open position that the plurality of guide vanes 3 are brought into a full open position after a given pressure level $P_A$ in the vicinity of the runner periphery has been established.

Practically, it is allowed to bring the plurality of guide vanes 3 into an open position immediately when the water-pumping-up pressure is established in the vicinity of the runner 1. In that case, there is eliminated a time loss (T4-T2) as experienced in the former case.

Figure 5:
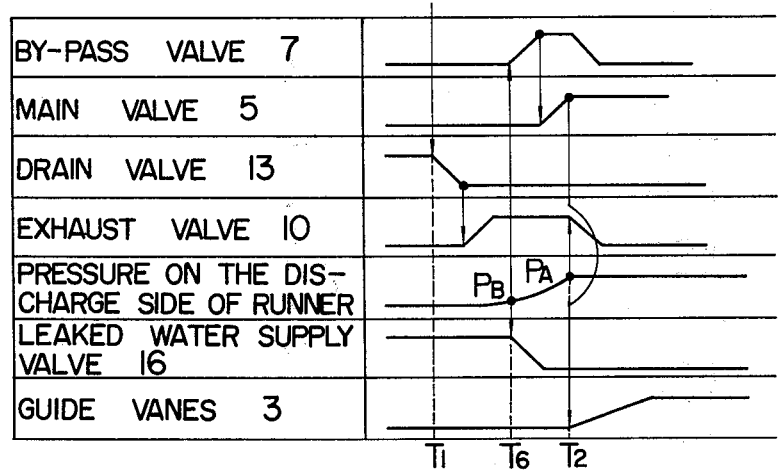

FIGS. 4 and 5 are a block diagram and flow chart of the method for starting a pump which eliminates the time loss as described. The device of this embodiment, in addition to the components of FIG. 2, includes another pressure sensitive switch 12A, which is connected to the runner chamber 18 for detecting pressure in the vicinity of the runner periphery and which is actuated upon detecting a given pressure level $P_B$ before the water-pumping-up pressure $P_A$. The pressure sensitive switch 12A is adapted to open the by-pass valve 7 and leaked water supply valve 16, while the pressure sensitive switch 12, which is actuated upon detecting the water-pumping-up pressure $P_A$, is adapted to actuate the exhaust valve 10 only. In this embodiment, the operational sequence from the closure of the drain valve 13 according to the water-pumping-up starting instruction until the opening of the exhaust valve 10 is quite the same as in the preceding embodiment. As a result that the exhaust valve 10 has been brought into a full open position, the level of water in the runner chamber 18 is raised, and when the pressure in the vicinity of the runner periphery reaches a predetermined pressure level $P_B$, the pressure sensitive switch 12A is actuated to turn the leaked water supply valve 16 to a close position and at the same time, to turn the by-pass valve 7 to a full open position. When the by-pass valve 7 has been brought into a full open position, the main valve 5 is turned to an open position according to the by-pass-valve-full-open-position-detecting signals. When the main valve 5 has been brought into a full open position, the main-valve-full-open-position-detecting signals are fed to the plurality of guide vanes 3, and thus, the guide vanes 3 begin to open. The pressure at which the pressure sensitive switch 12A is actuated is predetermined to a pressure level $P_B$ in a manner that a period of time during which the pressure in the vicinity of the runner periphery is raised from a pressure level $P_B$ to a level as high as the water-pumping-up pressure $P_A$ is equal to a period of time since the by-pass valve 7 has begun to open until the guide vanes 3 begin to open. Thus, the pressure in the vicinity of the runner periphery has reached the water-pumping-up pressure $P_A$, until the guide vanes 3 begin to open. At this time, the pressure sensitive switch 12 is actuated to close the exhaust valve 10.

According to the method shown in the second embodiment, irrespective of a time at which the by-pass valve 7 and main valve 5 are brought into an open position, the plurality of guide vanes begin to open immediately when the pressure in the vicinity of the runner periphery reaches the water-pumping-up pressure, and thus, the water-pumping-up running is commenced. Thus, a time loss (T4-T2 in FIG. 3) as experienced in the preceding embodiment is eliminated. In this embodiment, the pressure sensitive switch 12 detects the water-pumping-up pressure $P_A$, and according to the signals, the exhaust valve 10 is brought into a close position. As an alternative, it is possible to close the exhaust valve 10 according to the main-valve-full-open-position detecting signals. In such a case, the pressure sensitive switch 12 may be omitted.

In the embodiments shown, the plurality of guide vanes 3 begin to open when the main valve 5 has been brought into a full open position. Referring to the relationship between an opening of the main valve 5 and that of the guide vanes 3 at the time of commencement of the water-pumping-up running, the main valve 5 need not be opened to the fullest, but may have an opening allowing the passing of an amount of water which leaks from the guide vanes 3. Viewing from the generally known relationship between an opening of the main valve 5 and that of the guide vanes 3, it is possible to begin to bring the guide vanes into an open position when the main valve 5 has been opened by 30%.

Figure 6:
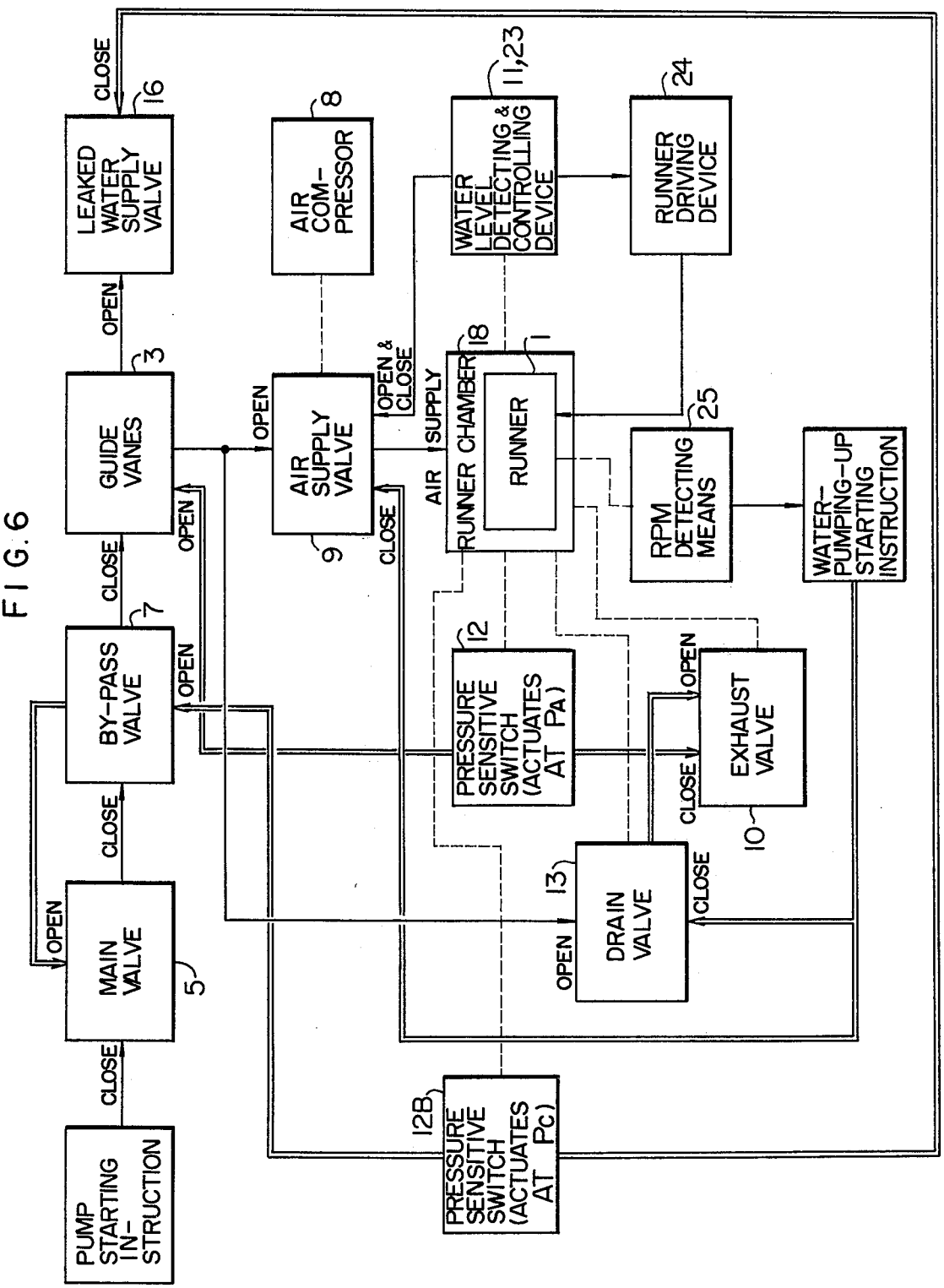
FIGS. 6 and 7 are a block diagram and flow chart, respectively, showing a further embodiment; and, FIGS. 8 and 9 are a block diagram and flow chart, respectively, showing a still further embodiment.
Figure 7:
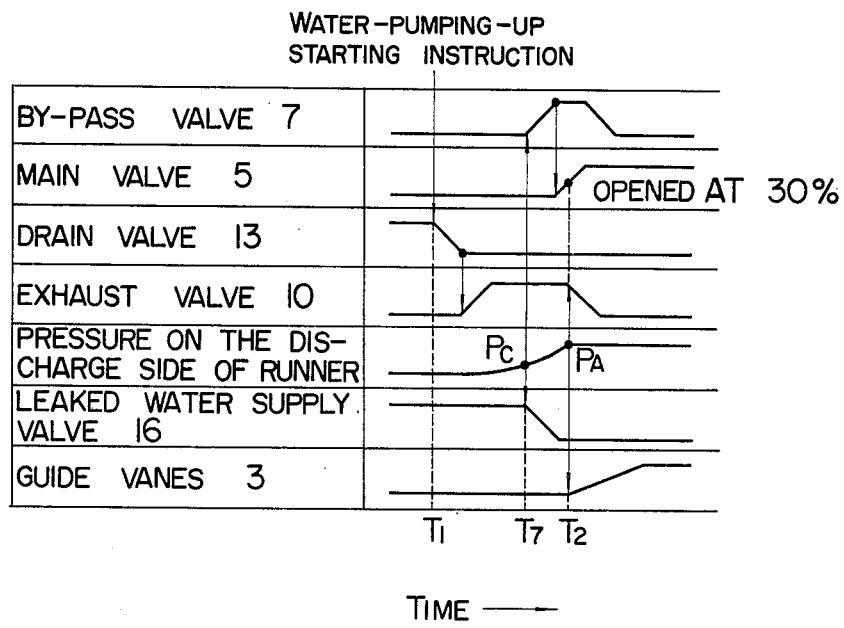

In the embodiment shown in FIGS. 6 and 7, the guide vanes 3 begin to open, when opening of the main valve 5 is more than 30%, and the pressure in the vicinity of the runner periphery has reached the water-pumping-up pressure $P_A$. In this embodiment, the pressure sensitive switch 12B is actuated when the pressure in the vicinity of the runner periphery in the runner chamber reaches a given pressure level $P_C$, thereby bringing the by-pass valve 7 into an open position, and at the same time closing the leaked water supply valve 16. When the by-pass valve 7 has been brought into a full open position, the main valve 5 begins to open according to the signals representing the full open position of the by-pass valve 7. On the other hand, when pressure in the vicinity of the runner periphery in the runner chamber is further raised and eventually has reached the water-pumping-up pressure $P_A$, then the pressure sensitive switch 12 is actuated, thereby closing the exhaust valve 10 and bringing the guide vanes 3 into an open position. The aforesaid given pressure level $P_c$ is predetermined in a manner that the main valve 5 is maintained open at least at 30% when the pressure sensitive switch 12 is actuated. According to the embodiment, a time at which the guide vanes 3 begin to open and a time at which pressure in the vicinity of the runner periphery reaches the water-pumping-up pressure completely coincide with each other.

In the embodiment shown in FIGS. 6 and 7, the main valve is arranged to open by more than 30% when the water-pumping-up pressure $P_A$ is established (shown at T2 in FIG. 7) by determining the operating pressure $P_c$ for the pressure sensitive switch 12B. A time T2-T7 during which pressure in the runner chamber is raised from $P_c$ to $P_A$ fluctuates to some extent, such that a case may arise where the water-pumping-up pressure $P_A$ has been established and the guide vanes 3 begin to open before the main valve has been opened at 30%. To avoid this, there may be attached to the main valve 5 means for detecting that the main valve has been opened at 30%, and producing detecting signals, so that the guide vanes 3 may not be opened until there are produced the output from the detecting means and the water-pumping-up pressure detecting signals from the pressure sensitive switch 12.

Figure 9:
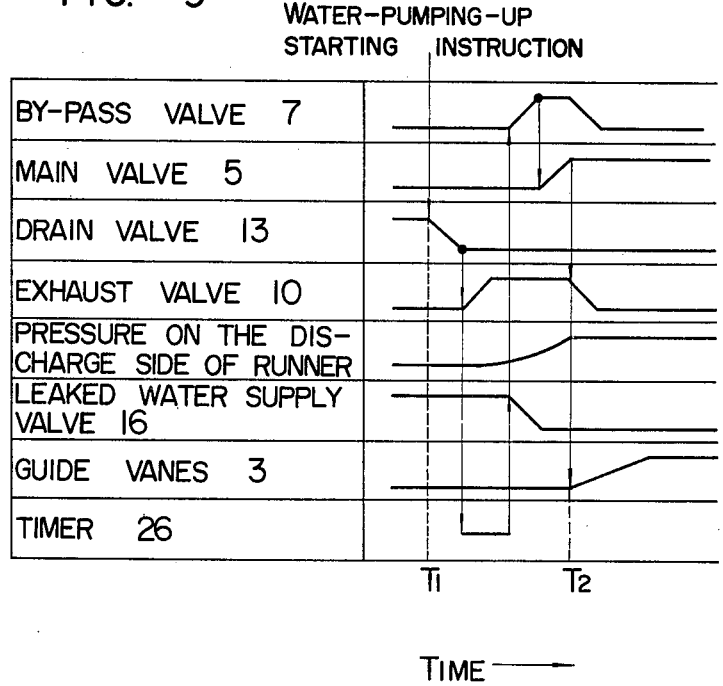

FIGS. 8 and 9 show a further embodiment. This is an example, in which measurement for pressure in the vicinity of the runner periphery in the runner chamber is not effected, and in turn a timer 26 is provided, which is arranged to be actuated when the exhaust valve 10 is brought into an open position. According to the water-pumping-up starting instruction, the drain valve 13 begins to open, and after the drain valve has been brought into a full open position, the exhaust valve 10 begins to open. As soon as the exhaust valve 10 has been brought into a full open position, the timer 26 is actuated, and at a given interval of time, the by-pass valve 7 and the leaked water supply valve 16 are actuated. After the by-pass valve 7 has been brought into a full open position, the main valve 5 beings to open, and after the main valve 5 has been opened to the fullest, the guide vanes 3 are brought into an open position, while the exhaust valve is closed. The timer is set in a manner that before the guide vanes 3 begin to open, pressure in the vicinity of the runner in the runner chamber has reached the water-pumping-up pressure.

What is claimed is:
1. In a method for starting a pumping operation of a pump device which includes a runner; a runner driving device; a runner chamber housing therein said runner; a plurality of openable guide vanes provided along the outer periphery of said runner chamber; a casing surrounding said guide vanes; a discharge tube coupled to said casing; a main valve; a by-pass valve, said main valve and said by-pass valve being provided in said discharge tube; a drain valve discharging from said runner chamber leaking water introduced therein; a compressed air feeding device connected to said runner chamber; an exhaust valve for discharging compressed air from the runner chamber; and a leaking water supply valve connected to said casing; the improvements comprising the steps of:
  closing the main valve, by-pass valve and guide vanes, opening the drain valve, and feeding compressed air to said runner chamber until said runner chamber is filled with compressed air and said runner is exposed to compressed air;
  energizing said runner driving device, thereby rotating the runner, closing said drain valve when said runner reaches a specified r.p.m. and opening said exhaust valve after said drain valve has been completely closed, thereby discharging compressed air from said runner chamber; and
  bringing said main valve, by-pass valve and guide vanes to an open position according to rise of water pressure in the vicinity of said runner periphery in said runner chamber, and closing said leaking water supply valve connected to the casing as well as said exhaust valve.

2. A method for starting a pump as defined in claim 1, wherein said method comprises the steps of:
  detecting pressure in the vicinity of the runner periphery;
  opening said by-pass valve as well as closing said leaking water supply valve when the pressure in the vicinity of said runner periphery reaches a given level before the water-pumping-up pressure;
  opening said main valve when said by-pass valve has been brought into a full open position; and
  bringing said plurality of guide vanes into an open position when said main valve has been brought into a full open position;
  said given pressure level being determined in a manner that when pressure in the vicinity of the runner periphery reaches the water-pumping-up pressure, the exhaust valve is closed, and a time at which the plurality of guide vanes begin to open and a time at which the pressure in the vicinity of the runner periphery reaches the water-pumping-up pressure completely coincide with each other.

3. A method for starting a pump as defined in claim 1, wherein said method further comprises the steps of:
  opening the by-pass valve and main valve as well as closing the leaked water supply valve when the pressure in the vicinity of the runner periphery is raised to a given pressure level before the water-pumping-up pressure; and
  closing the exhaust valve as well as opening the guide vanes when the pressure in the vicinity of the runner periphery reaches the water-pumping-up pressure.

4. A method for starting a pump as defined in claim 3, wherein the plurality of guide vanes are brought into an open position in the condition where the pressure in the vicinity of the runner periphery reaches the water-pumping-up pressure and the main valve is opened to provide an opening of more than 30%.

5. A method for starting a pump as defined in claim 1, wherein said method further comprises the steps of:
  opening the by-pass valve as well as closing the leaking water supply valve when the pressure in the vicinity of the runner periphery reaches a given level before the water-pumping-up pressure;
  turning the main valve to an open position when the by-pass valve has been brought into a full open position; and
  turning the plurality of guide vanes to an open position as well as closing the exhaust valve when the main valve has been brought into a full open position.

6. A method for starting a pump as defined in claim 1, wherein said method further comprises the steps of:
  opening the exhaust valve after the drain valve has been brought into a close position;
  opening the by-pass valve as well as closing the leaking water supply valve at a given time interval after the exhaust valve has begun to open;
  opening the main valve after the by-pass valve has been brought into a full open position; and
  opening the plurality of guide vanes as well as closing the exhaust valve after the main valve has been brought into a full open position; said given time interval being determined in a manner that a time at which the guide vanes begin to open and a time at which the pressure in the vicinity of the runner periphery reaches the water-pumping up pressure completely coincide with each other.

7. A device for starting a pump, which includes a runner; a runner driving device; a runner chamber housing therein said runner; a plurality of openable guide vanes provided along the outer periphery of said runner chamber; a casing surrounding said guide vanes; a discharge tube coupled to said casing; a main valve; a by-pass valve, said main valve and said by-pass valve being provided in said discharge tube; a drain valve discharging from said runner chamber leaking water introduced therein; a compressed air supply valve connected to said runner chamber; an exhaust valve for discharging compressed air from the runner chamber; and a leaking water supply valve connected to said casing, comprising:
  means for sequentially closing said main valve, said by-pass valve and said plurality of guide vanes according to a prescribed pump-starting instruction;
  means for opening said leaking water supply valve and said air supply valve due to the closure of said guide vanes, said leaking water supply valve feeding leaked water to said casing, and said air supply valve feeding air to said runner chamber;
  means for detecting and controlling the water level in said runner chamber, said means detecting the level of water in said runner chamber and closing said air supply valve when the level of water in said runner chamber reaches a given water level, said means opening and closing in proper timing said air supply valve, thereby maintaining the water level in said runner chamber at a given level in the stages succeeding thereto, and said means actuating said runner driving device which rotates said runner in the direction of pump action;
  r.p.m. detecting means for detecting that said runner reaches a specified r.p.m.;
  means for closing said drain valve as well as said air supply valve when said r.p.m. detecting means has detected the specified r.p.m. of the runner;
  means for opening said exhaust valve to discharge air from the runner chamber when said drain valve has been closed;
  means for opening said by-pass valve as well as closing said exhaust valve and said leaking water supply valve according to the variation in water pressure in the vicinity of the runner; and
  means for sequentially opening said main valve and said plurality of guide vanes when said by-pass valve has been brought into a full open position.

8. A device for starting a pump as defined in claim 7, wherein said device further comprises:
  a first pressure sensitive switch adapted to be actuated upon sensing a given water pressure before the water-pumping-up pressure, to which pressure the water pressure in the vicinity of the runner periphery is raised, thereby opening the by-pass valve and main valve as well as closing the leaking water supply valve; and
  a second pressure sensitive switch adapted to be actuated upon sensing that the water pressure in the vicinity of the runner periphery has reached the water-pumping-up pressure, thereby opening said plurality of guide vanes as well as closing the exhaust valve.

9. A device for starting a pump as defined in claim 7, wherein there is further provided a pressure sensitive switch adapted to be actuated when the pressure in the vicinity of the runner has reached the water-pumping-up pressure, thereby opening said by-pass valve, said main valve and said plurality of guide vanes sequentially, and closing said exhaust valve and said leaking water supply valve when said by-pass valve begins to open.

10. A device for starting a pump as defined in claim 7, wherein said device further comprises:
- a first pressure sensitive switch adapted to be actuated upon sensing a given level of pressure before the water-pumping-up pressure, to which pressure the pressure in the vicinity of the runner is raised, thereby opening said by-pass valve, said main valve and said plurality of guide vanes in the sequence described, and closing said leaking water supply valve as soon as said by-pass valve begins to open; and
- a second pressure sensitive switch adapted to be actuated when the water pressure in the vicinity of the runner periphery reaches said water-pumping-up pressure, thereby closing the exhaust valve.

11. A device for starting a pump as defined in claim 10, wherein the level of pressure at which said first pressure sensitive switch is actuated is predetermined in a manner such that the time at which said plurality of guide vanes begins to open according to the actuation of said first pressure sensitive switch coincides with the time at which said second pressure sensitive switch is caused to actuate, said second pressure sensitive switch being actuated when water pressure in the vicinity of the runner periphery has reached said water-pumping-up pressure.

12. A device for starting a pump, which includes a runner; a runner driving device; a runner chamber housing therein said runner; a plurality of openable guide vanes provided along the outer periphery of said runner chamber; a casing surrounding said guide vanes; a discharge tube coupled to said casing; a main valve; a by-pass valve, said main valve and said by-pass valve being provided in said discharge tube; a drain valve discharging from said runner chamber leaking water introduced therein; a compressed air supply valve connected to said runner chamber; an exhaust valve for discharging compressed air from the runner chamber; and a leaking water supply valve connected to said casing, comprising;
- means for sequentially closing said main valve, said by-pass valve and said plurality of guide vanes according to a prescribed pump-starting instruction;
- means for opening said leaking water supply valve and said air supply valve when said plurality of guide vanes have been closed, said leaking water supply valve feeding water to said casing, and said air supply valve feeding air to said runner chamber;
- an air compressor for feeding compressed air by way of said air supply valve to said runner chamber;
- water-level detecting and controlling means for detecting the level of water in said runner chamber and closing said air supply valve when the level of water in said runner chamber reaches a given water level, and for opening and closing, in proper timing, said air supply valve, for maintaining the level of water in said runner chamber constant in the stages succeeding thereto, and for actuating said runner driving device which rotates said runner in the direction of pump action;
- r.p.m. detecting means for detecting that said runner reaches a specified r.p.m.;
- means for closing said drain valve as well as closing said air supply valve when said r.p.m. detecting means detects the specified r.p.m. of the runner;
- means for opening said exhaust valve when said drain valve is closed, to discharge air from the runner chamber;
- a timer adapted to be actuated for a given period of time when said exhaust valve has been opened; and
- means for properly opening said by-pass valve, said main valve and said plurality of guide vanes as well as closing said leaking water supply valve and said exhaust valve according to the actuation of said timer.

13. A device for starting a pump as defined in claim 12, wherein the time at which said plurality of guide vanes being to open coincides with the time at which water pressure in the vicinity of the runner periphery reaches water-pumping-up pressure.

* * * * *